(12) United States Patent
Fawkes et al.

(10) Patent No.: US 6,583,213 B1
(45) Date of Patent: Jun. 24, 2003

(54) AMINE DISPERSANTS

(75) Inventors: David Melville Fawkes, Manchester (GB); Dean Thetford, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/674,270

(22) PCT Filed: Apr. 20, 1999

(86) PCT No.: PCT/GB99/01201

§ 371 (c)(1),
(2), (4) Date: Oct. 30, 2000

(87) PCT Pub. No.: WO99/55763

PCT Pub. Date: Nov. 4, 1999

(30) Foreign Application Priority Data

Apr. 28, 1998 (GB) .............................................. 9809025

(51) Int. Cl.$^7$ ................................................ C08L 51/00
(52) U.S. Cl. ...................................................... 524/539
(58) Field of Search .......................................... 524/539

(56) References Cited

U.S. PATENT DOCUMENTS 4,933,098 A * 6/1990 Gutierrez ................... 252/51.5
5,721,329 A * 2/1998 Fujiwa ....................... 526/316

FOREIGN PATENT DOCUMENTS

| EP | 484152 | * | 6/1992 |
| EP | 713 894 | | 5/1996 |
| GB | 2325935 | * | 9/1998 |
| WO | WO 98 19784 | | 5/1998 |

* cited by examiner

*Primary Examiner*—Edward J. Cain
(74) *Attorney, Agent, or Firm*—Pillsbury Winthrop LLP

(57) ABSTRACT

An amine dispersant containing one or more amino and/or imino groups, a poly(oxy-$C_{1-6}$-alkylene carbonyl) chain (POAC chain) obtainable from two or more different linear hydroxycarboxylic acids or lactones thereof and a residue of an ethylenically unsaturated group wherein the amino and/or imino groups are attached via the ethylenically unsaturated group. The POAC chain may be made from 2-hydroxyethylacrylate, ε-caprolactone and δ-valerolactone and the amine and/or imino groups may be provided by polyethyleneimine.

18 Claims, No Drawings

AMINE DISPERSANTS

The present invention relates to a dispersant having an amino group(s) which contains one or more poly (oxyalkylene carbonyl) chains derived from two or more different linear hydroxy-$C_{1-6}$-alkylene carboxylic acids or lactones thereof wherein the amine is attached to an ethylenically unsaturated group by a Michaels addition reaction. These dispersants are particularly useful for dispersing particulate solids in an organic medium and in the preparation of dispersions and millbases for use in paints and printing inks.

EP 713,894 discloses dispersants containing amino groups and a polyoxyalkylene chain (hereinafter POAC chain) wherein the amino group is attached via a Michaels addition reaction to the POAC chain carrying an ethylenically unsaturated group. It is also disclosed that when lactones containing side chains are used, such as 4-methyl caprolactone and 2-methyl caprolactone, the resultant dispersants exhibit excellent compatability in resins and excellent solvent solubility. Examples are included where the dispersant is the Michaels addition product of polyethyleneimine and a hydroxyethylacrylate attached to a POAC chain which is a copolymer obtained by reacting 4-methyl caprolactone with ε-caprolactone.

It has now been found that more effective dispersants can be obtained without the need for expensive alkyl substituents in the caprolactone by using a POAC chain obtainable from two or more different and linear hydroxy-$C_{1-6}$-alkylene carboxylic acids or lactones thereof.

According to the invention there is provided an amine dispersant containing one or more amino and/or imino groups, a poly(oxy-$C_{1-6}$-alkylenecarbonyl) chain (hereinafter POAC chain) obtainable from two or more different linear hydroxy carboxylic acids or lactones thereof and a residue of an ethylenically unsaturated group wherein the amino and/or imino group is attached via the ethylenically unsaturated group, including salts thereof.

The POAC chain may be the residue of a block or preferably random polymer.

Preferably, the dispersant is obtainable from two different linear hydroxy-$C_{1-6}$-alkylene carboxylic acids or lactones thereof.

Examples of suitable hydroxy carboxylic acids are glycolic, lactic, hydroxy valeric and hydroxy caproic acids.

Preferably, the POAC chain is obtainable from lactones such as β-propiolactone, γ-butyrolactone, δ-valerolactone and ε-caprolactone. POAC chains derivable from δ-valerolactone and ε-caprolactone are much preferred.

According to a first aspect of the invention, the amine dispersant is a compound of formula 1

$$T—(CO—V—O)_m—X—Z \quad (1)$$

wherein

T is hydrogen or a polymerisation terminating group;

(CO—V—O) represents a POAC chain obtained from two or more different linear hydroxy-$C_{1-6}$-alkylene carboxylic acids or lactones thereof;

X is a bridging group which contains a residue of an ethylenically unsaturated group;

Z is an amino or imino group or a moiety containing an amino or imino group attached to X via the ethylenically unsaturated group; and m is from 2 to 200.

In the dispersant of formula 1, the group T may be attached to the POAC chain $(CO—V—O)_m$ via an oxygen bridge or a carbonyl bridge. Thus, when T is attached to $(CO—V—O)_m$ via an oxygen bridge, the group —X—Z is attached via a carbonyl bridge and when T is attached to $(CO—V—O)_m$ via a carbonyl bridge then —X—Z is attached to $(CO—V—O)_m$ via an oxygen bridge.

Preferably, the POAC chain $(CO—V—O)_m$ is a chain of formula 2

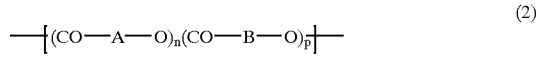

wherein

A is —$(CH_2)_5$—;

B is —$(CH_2)_4$—; and n+p is m.

The ratio of n to p is preferably from 10:1 to 1:10, more preferably from 10:1 to 1:1 and especially from 5:1 to 1:1.

It is also preferred that m is not less than 5 and not less than 10. Preferably, m is not greater than 100, more preferably not greater than 70 and especially not greater than 50.

When Z is or contains more than one amino or imino group there may be more than one POAC chain attached to Z via the group X.

The amino or imino group represented by Z or moiety containing the amino or imino group is preferably an amine or diamine, which may be aliphatic or aromatic and especially a polyamine or polyimine.

Examples of suitable amines are ethylenediamine, $N,N^1$-dimethylethylenediamine, piperazine, 2-methylpiperazine, 2,5-dimethylpiperazine, 2,3-dimethylpiperazine, 1,4-bis(3-aminopropyl)piperazine, N-aminoethylpiperazine, isophorondiamine, polyoxypropylenediamine, polyoxyethylenediamine, bis(4-amino-3-methyl dicyclohexyl)methane, diaminodicyclohexylmethane, bis (aminomethyl)cyclohexane, m-xylylenediamine, α-(m-aminophenyl)ethylamine, α-(p-aminophenyl)ethylamine, m-phenylenediamine, diaminodiphenylmethane, diaminodiphenylsulphone and norbornanediamine.

Examples of suitable polyamines are polyallylamine and polyvinylamine.

Examples of suitable polyimines are poly($C_{2-4}$)-alkyleneimine (hereinafter PAI) and especially polyethyleneimine (hereinafter PEI).

Preferably Z is derivable from a diamine, a polyamine and especially a polyimine.

When Z is a polyamine or polyimine, the amine dispersant may be conveniently represented by formula 3

wherein

X—*—*—X represents a polyamine or polyimine;

Y represents a POAC chain; and q is from 2 to 2000.

Preferably, q is not less than 4 and especially not less than 10. It is also preferred that q is not greater than 1000 and especially not greater than 500.

It is also preferred that the weight ratio of the POAC chains represented by Y to the polyamine or polyimine represented by X—*—*—X is between 30:1 and 1:1, more preferably between 20:1 and 4:1 and especially between 18:1 and 8:1.

The number average molecular weight of the polyamine or polyimine is preferably from 500 to 600,000, more preferably from 1,000 to 200,000, even more preferably from 1,000 to 100,000 and especially from 5,000 to 100,000.

When T is a polymerisation terminating group it is preferably optionally substituted $C_{1-35}$-hydrocarbyl which may be aromatic, alicyclic, heterocyclic or aliphatic which may be linear or branched, saturated or unsaturated. Preferably, T contains not greater than 20 carbon atoms and more preferably not greater than 10 carbon atoms.

Optional substituents in T include halogen, $C_{1-4}$-alkoxy, ester (i.e. OCO), amide, thioether, urethane and ether groups. When T contains one or more ether groups it is preferably derivable from propylene and/or ethyleneoxide.

When T contains ester, amide or urethane groups, such groups may be made by linking together fragments of T which contain amino or hydroxy groups using, for example, dibasic acids or anhydrides or di-isocyanates. Examples of such linking agents are terephthalic acid, adipic acid, phthalic anhydride and toluene di-isocyanate.

As noted hereinbefore, T may be attached to the POAC chain via an oxygen atom or a carbonyl group in the POAC chain. Thus, the POAC chain is obtainable by reacting a monohydroxy compound T—OH with the hydroxycarboxylic acids or lactones thereof to give an alcohol containing the POAC chain and polymerisation terminating group (hereinafter TPOAC alcohol) of formula 4

$$TO-(CO-V-O)_m-H \qquad (4)$$

wherein T, (CO—V—O) and m are as defined hereinbefore.

Examples of monohydroxy compounds of formula T—OH are phenols and alcohols such as methanol, ethanol, butanol, octanol, decanol, lauryl alcohol and stearyl alcohol.

Alternatively, T may be the residue of a carboxylic acid T—COOH wherein the POAC chain is attached to T by a carbonyl group (hereinafter TPOAC acid) of formula 5

$$T-CO(O-V-CO)_m-OH \qquad (5)$$

wherein T, (CO—V—O) and m are as defined hereinbefore.

Examples of carboxylic acids are acetic, methoxyacetic, propionic, pentanoic, hexanoic, lauric, ricinoleic, stearic, 12-hydroxystearic, 12-hydroxydodecanoic, 5-hydroxydodecanoic, 5-hydroxydecanoic and 4-hydroxydecanoic acids.

The polymerisation terminating group may also contain the ethylenically unsaturated group. In one particularly preferred aspect of the invention the polymerisation terminating group contains both an ethylenically unsaturated group and a hydroxy group which reacts with the linear hydroxy $C_{1-6}$-alkylene carboxylic acids or lactones therefore. The TPOAC alcohol of formula 4 thus contains an ethylenically unsaturated group in the polymerisation terminating moiety T.

According to one variant of the first aspect of the invention, there is provided an amine dispersant containing one or more groups of formula 6 attached to Z

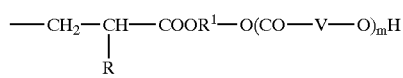

$$(6)$$

wherein (CO—V—O) and m are as defined hereinbefore, —CH$_2$—CH(R)—COOR$^1$-O— is a linking group, R is H or $C_{1-4}$-alkyl and especially methyl, and R$^1$ is an aliphatic or aromatic residue containing up to 10 carbon atoms which optionally contains a polyether group derivable from propyleneoxide and/or ethylene oxide. As noted hereinbefore, a preferred amine dispersant of this type is a compound of formula 3.

The dispersants of formula 6 may be conveniently prepared by the Michaels addition of an amine, imine, polyamine or polyimine to a compound of formula 7

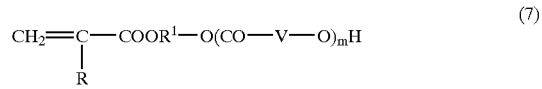

$$(7)$$

wherein R, R$^1$, (CO—V—O) and m are as defined hereinbefore.

The compounds of formula 7 may be conveniently prepared by reacting a (alk)acrylic acid containing a hydroxy group such as hydroxyethyl (meth)acrylic acid with a TPOAC acid of formula 5 where T is H or preferably with the hydroxycarboxylic acids or lactones thereof. In the case where the compound of formula 7 is made by reacting the (alk)acrylic acid with the hydroxycarboxylic acids or lactones thereof, the (meth)acrylic acid containing the hydroxy group acts as a polymerisation terminator.

Examples of (meth)acrylic acid containing a hydroxy group are hydroxyethyl(meth)acrylate, hydroxypropyl (meth)acrylate, hydroxybutyl(meth)acrylate, polyethyleneglycol mono(meth)acrylate, polypropyleneglycol mono (meth)acrylate, polyethyleneglycol-polypropyleneglycol mono(meth)acrylate, polyethyleneglycol-polytetramethyleneglycol mono(meth)acrylate and polypropyleneglycol-polytetramethyleneglycol mono(meth) acrylate (e.g. Blemmer PE, Blemmer PP from Nihon Yushi Co. Ltd.).

The compounds of formula 7 may be conveniently prepared by reacting the (alk)acrylic acid containing a hydroxy group with the hydroxycarboxylic acids or lactones thereof at 50 to 150° C., preferably at 80–120° C. in the presence of air or oxygen. Preferably, the reaction is carried out in the presence of a catalyst such as tetraalkyltitanate such as tetrabutyltitanate, a metal alkoxide such as tetraisopropyltitanate, a tin catalyst such as stannous chloride, stannous octylate or monobutyltinoxide or an acid catalyst such as p-toluenesulphonic acid or trifluoroacetic acid. The reaction is also preferably carried out in the presence of a polymerisation inhibitor to prevent the self-polymerisation of the (alk)acrylic acid containing the hydroxy group. Examples of polymerisation inhibitors are (methyl)hydroquinone and phenothiazine. Oxygen also acts as a polymerisation inhibitor for the (alk)acrylic acid containing a hydroxy group.

The amines to be used in the Michaels addition reaction with the compounds of formula 7 may in principle be any amine which may be aliphatic, aromatic or heterocyclic.

The reaction between the amine or imine and the compound of formula 7 is preferably carried out between 10 and 130° C., especially between 20 and 100° C. Stoichiometric amounts of the amine or imine and compound of formula 7 may be used. However, in a preferred class of dispersants obtainable from polyamines or polyimines an excess of compound of formula 7 is used. The reaction involving the amine or imine and compound of formula 7 may be carried out in the presence of a solvent which is inert to the reactants. Examples of suitable solvents are aromatic or aliphatic solvents such as xylene, toluene and Solvesso, ketones such as acetone, methylethylketone and methylisobutylketone, alkanols such as n-butanol and isopropanol and ethers such as dimethyladipate, dimethylsuccinate and dimethylglutarate.

According to another variant of the first aspect of the invention the dispersant may be prepared from a TPOAC alcohol of formula 4 by reacting the hydroxy group with a compound containing an ethylenically unsaturated group. The compound containing the ethylenically unsaturated group which reacts with the hydroxy group of the TPOAC alcohol may contain an isocyanate group but preferably contains a carboxylic acid or ester group. It is especially preferred that the compound which reacts with the hydroxy group of the TPOAC is an (alk)acrylic acid or ester. Examples are acrylic acid and methacrylic acid and their methyl esters.

The reaction between the TPOAC alcohol and (alk)acrylic acid or ester thereof may be carried out under similar conditions to that described hereinbefore for preparing the compound of formula 7.

The reaction between the ethylenically unsaturated group and the amine, imine, polyamine or polyimine may be carried out as described hereinbefore.

In the special case where T in the TPOAC alcohol contains an ethylenically unsaturated group which is capable of reacting with amines by a Michaels addition reaction, this particular variant of the first aspect of the invention results in a compound having two ethylenically unsaturated groups capable of undergoing a Michaels addition reaction with amines. Since this could result in deleterious cross-linking it is preferred that only the one ethylenically unsaturated group capable of Michaels addition reactions is present, i.e. in this particular variant, T is a polymerisation terminating group which does not contain an ethylenically unsaturated group capable of a Michaels addition reaction with amines.

According to a second and less preferred aspect of the invention, the dispersant is obtainable from a TPOAC acid of formula 5.

The TPOAC acid may conveniently be prepared by reacting a carboxylic acid T—COOH as polymerisation terminator with two or more linear hydroxy-$C_{1-6}$-alkylenecarboxylic acids or lactones thereof. The polymerisation terminating group may contain the ethylenically unsaturated group. In such a case, T—COOH is a (alk)acrylic acid such as (meth)acrylic acid. The TPOAC acid is also obtainable by a transesterification reaction involving an (alk)acrylic acid ester such as a (meth)acrylic acid ester, for example, methyl(meth)acrylate.

When the TPOAC acid does not contain an ethylenically unsaturated group such group may be conveniently introduced by reacting the free carboxylic acid group of the TPOAC acid with a compound capable of reacting with the carboxylic acid group and which contains the ethylenically unsaturated group. The compound capable of reacting with the carboxylic acid group may contain a hydroxy group such as an ethylenically unsaturated alcohol such as vinyl alcohol, a hydroxyalkyl(alk)acrylate such as hydroxyethyl (meth)acrylate, hydroxypropyl(meth)acrylate and hydroxybutyl(meth)acrylate or the compound capable of reacting with the carboxylic acid group of the TPOAC acid may be an epoxide carrying an ethylenically unsaturated group such as a glycidyl(alk)acrylic acid such as glycidyl (meth)acrylic acid.

By a simple variant of the foregoing reactions where T contains an ethylenically unsaturated group it is possible to react the carboxylic acid of the TPOAC acid with a compound containing a further ethylenically unsaturated group such as a glycidyl(alk)acrylate. Such TPOAC acid derivatives containing two ethylenically unsaturated groups are not preferred, however, since the subsequent reactions with amines and especially polyamines and polyimines can result in deleterious cross-linking. It is, therefore, preferred that the compounds used to prepare the dispersants of the present invention contain only the one ethylenically unsaturated group.

The compounds of formula 7 are believed to be novel. Hence, as another aspect of the invention there is provided an acrylate of formula 7.

The amine dispersants may be in the form of their salt with either an inorganic acid or organic acid. Examples of such acids are hydrohalic acids such as hydrochloric acid and acetic acid. The amine dispersant may also be in the form of a quaternary ammonium salt where the dispersant is obtainable from a polyamine or polyimine. Such quaternary ammonium salts may be obtained by reacting any of the free amino or imino groups with quaternising agents such as alkyl halides like methyl chloride or with dialkyl sulphates such as dimethyl sulphate.

The amine dispersant may also be in the form of a salt with a "coloured acid". By the term "coloured acid" is meant an organic pigment or dyestuff containing at least one, preferably from 1 to 6, acid groups, especially sulphonic, phosphonic or carboxylic acid groups. A preferred coloured acid is copper phthalocyanine or other deeply coloured pigment and especially sulphonated copper phthalocyanine containing, on average, from 0.5 to 3 sulphonic acid groups per molecule.

As noted hereinbefore, the dispersants are particularly useful for dispersing a particulate solid in an organic medium.

According to a further aspect of the invention there is provided a composition comprising a particulate solid and an amine dispersant.

According to a still further aspect of the invention there is provided a dispersion comprising an amine dispersant, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, diazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over known dispersants derived from ε-caprolactone. In particular, they exhibit superior solubility in organic media such as solvents and do not separate or crystallise when stored at 4° C. for lengthy periods. When stored at low temperatures, separation can occur at, for example, −10° C. but the dispersants readily re-dissolve on warming to 4–20° C. When incorporated into paints and painting inks, the dispersants of the present invention give rise to higher gloss readings and lower haze values in the resultant paints and inks.

The invention is further illustrated by the following examples wherein all references to amounts are in parts by weight unless indicated to the contrary.

EXAMPLES

In the descriptors of the following examples the figures in parentheses following the components of the POAC chain indicate their molar ratios and the figure in parentheses following the amine represent the weight ratio of POAC chain to amine. Thus, in Example 1, 2-hydroxyethylacrylate, ε-caprolactone and δ-valerolactone are reacted in the molar ratio 1:12:6 and 13 parts by weight of this POAC chain are reacted with 1 part by weight PEI.

Example 1

HEA, ε-cap, δ-val (1:12:6) PEI (13:1)

2-Hydroxyethylacrylate (5 parts, 0.043M ex Aldrich), ε-caprolactone (59 parts, 0.517M ex Aldrich) and δ-valerolactone (25.86 parts, 0.258M ex Fluka) were stirred at 100° C. for 10 hours in the presence of methyihydroquinone (0.06 parts, ex Aldrich) and zirconium butylate (0.3 parts ex Fluorochem) whilst blowing air through the reactants.

The reactants were then cooled to 65° C. and polyethyleneimine (6.91 parts SP200; MW 10,000 ex Nippon Shokhubai) were added and the reactants stirred at 65° C. for 2 hours. On cooling, the product was obtained as a golden orange viscous liquid (60 parts). This is Dispersant 1.

Comparative Example A

HEA, ε-cap (1:12) PEI (13:1)

Example 1 was repeated except omitting the δ-valerolactone and reducing the amount of polyethyleneimine to 4.85 parts. The product was obtained as a light brown viscous liquid which gave a cream wax on cooling (59 parts). This is Dispersant A.

Example 2

HEA, ε-cap, δ-val (1:15:5) PEI (13:1)

This was prepared in analogous manner to Dispersant 1 of Example 1 except using 2-hydroxyethylacrylate (5 parts, 0.043M), ε-caprolactone (73.7 parts, 0.657M), δ-valerolactone (21.55 parts, 0.215M), methylhydroquinone (0.01 part) and polyethyleneimine (11.06 parts). Tin octanoate (0.1 part ex Elementis) was used as catalyst in place of the zirconium butylate. On cooling the product was obtained as a pale yellow viscous liquid (80 parts). This is Dispersant 2.

Comparative Example B

HEA ε-cap (1:15) PEI (13:1)

This was prepared in identical manner to Dispersant 2 of Example 2 except omitting the δ-valerolactone and using 8.67 parts polyethyleneimine. On cooling, the product was obtained as a white waxy solid (80 parts). This is Dispersant B.

Examples 3,4 and Comparative Examples C and D

The amine dispersant (2 parts) was dissolved in a 4:1 mixture of methoxypropylacetate and n-butanol (10 ml) with warming as necessary. The appearance of the solution was then examined after standing at 20° C., after 5 days at 4° C., after 3 days at −10° C. and after returning to 20° C. following the storage at −10° C. The results are given in Table 1 below.

TABLE 1

| | | Appearance of Solution | | | |
|---|---|---|---|---|---|
| Example | Dispersant | at 20° C. | 5 days at 4° C. | 3 days at −10° C. | at 20° C. after 3 days at −10° C. |
| 3 | 1 | Clear | Clear | Clear | Clear |
| 4 | 2 | Clear | Clear | Clear | Clear |
| C | A | Clear | Few Crystals | Crystals | Clear |
| D | B | Clear | Crystals | Crystals | Crystals |

Example 5

HEA, ε-cap, δ-val (1:12:3)

2-Hydroxyethylacrylate (15 parts, 0.129M ex Aldrich), ε-caprolactone (176.93 parts, 1.55M ex Aldrich) and δ-valerolactone (38.8 parts, 0.388M ex Fluka) were stirred at 100° C. for 72 hours in the presence of tin octanoate (0.3 part ex Elementis) and methylhydroquinone (0.03 part ex Aldrich) whilst blowing air through the reactants. The product was obtained as a clear viscous liquid giving a white wax on cooling (225 parts). This is Intermediate 1.

Example 6

HEA, ε-cap, δ-val (1:12:3) PEI (18:1)

Intermediate 1 (45 parts ex Example 5) and polyethyleneimine (5 parts as 50% solution in water, Lupasol G100 ex BASF, MW 5000) were stirred at 65° C. for 4 hours whilst blowing air through the reactants. The reactants were then stirred for 2 hours at 110° C. The product was obtained as a thick red-brown viscous liquid which gave a red-brown wax on cooling (40 parts). This is Dispersant 3.

Example 7

HEA, ε-cap, δ-val (1:12:3) PEI (9:1)

This was prepared in similar manner to Dispersant 3, Example 6 above except using 50 parts Intermediate 1 and 11.11 parts Lupasol G100. The product was obtained as a red-brown wax (50 parts). This is Dispersant 4.

Example 8

HEA, ε-cap, δ-val (1:8:8)

This was prepared in similar manner to Intermediate 1, Example 5 except using 5 parts 2-hydroxyethylacrylate, 39.32 parts ε-caprolactone and 34.49 parts δ-valerolactone. The product was obtained as a white wax (76.5 parts). This is Intermediate 2.

Example 9

HEA, ε-cap, δ-val (1:8:8) PEI (13:1)

Intermediate 2 (39 parts ex Example 8) and polyethyleneimine (3 parts, SP200 ex Nippon Shokhubai, MW 10,000) were stirred at 65° C. for 4 hours whilst blowing air through the reactants. The product was obtained as a thick viscous yellow liquid (40 parts). This is Dispersant 5.

Example 10

HEA, ε-cap, δ-val (1:12:3) PA (13:1)

Intermediate 1 (26 parts ex Example 5), polyallylamine (2 parts ex Aldrich, MW 8,500–11,000) and water (6 parts) were stirred at 65° C. for 3 hours whilst passing air through the reactants. The reaction was continued for 3 hours at 120° C. On cooling, the product was obtained as a soft beige wax (25 parts). This is Dispersant 6.

Examples 11 to 14

The Dispersant (2 parts) was dissolved in a 4:1 mixture of methoxypropylacetate/n-butanol (10 mls) and the solution examined after 16 hours at 20° C., 3 days storage at 4° C., 3 days storage at –10° C. and after storing for 3 days at –10°C. followed by allowing to warm to 20° C. The results are given in Table 2 below.

TABLE 2

| | | Storage | | | |
|---|---|---|---|---|---|
| Example | Dispersant | 16 hours at 20° C. | 3 days at 4° C. | 3 days at –10° C. | 3 days at –10° C. then 20° C. |
| 11 | 3 | H | H | C | Cl |
| 12 | 4 | H | H | C | Cl |
| 13 | 5 | Cl | Cl | Cl | Cl |
| 14 | 6 | Cl | Cl | S | Cl |

Footnote to Table 2
H is hazy solution, C is crystals present, S is solid and Cl is clear solution.

Examples 15 to 18

Dispersions were prepared by milling Monolite Rubine 3B (2 parts ex Zeneca) with Disperant (0.45 parts) in a 4:1 mixture of methoxypropylacetate/n-butanol (7.55 parts) containing 3 mm glass beads (17 parts) using a horizontal shaker for 16 hours. The viscosity of the resultant dispersion was assessed using an artibrary scale A to E (good to bad). The results are given in Table 3 below.

TABLE 3

| Example | Dispersant | Fluidity |
|---|---|---|
| 15 | 3 | C/D |
| 16 | 4 | D |
| 17 | 5 | C/D |
| 18 | 6 | C/D |
| Control | — | E |

Footnote to Table 3
The control contains no dispersant and consists of 2 parts pigment and 8 parts of the mixed solvent.

What is claimed is:

1. An amine dispersant containing one or more amino and/or imino groups, a poly(oxy-$C_{1-6}$-alkylene carbonyl) chain (POAC chain) obtained from two or more different linear hydroxycarboxylic acids or lactones thereof and a residue of an ethylenically unsaturated group wherein the amino and/or imino group is attached via the ethylenically unsaturated group, including salts thereof.

2. An amine dispersant as claimed in claim 1 wherein the amine dispersant contains a poly(oxy-$C_{1-6}$-alkylenecarbonyl) chain obtained from two different linear hydroxycarboxylic acids or lactones thereof.

3. An amine dispersant as claimed in either claim 1 or claim 2 wherein the poly(oxy-$C_{1-6}$-alkylenecarbonyl) chain is obtained from δ-valerolactone and ε-caprolactone.

4. An amine dispersant as claimed in claim 1 which is a compound of formula 1

$$T-(CO-V-O)_m-X-Z \quad (1)$$

wherein

T is hydrogen or a polymerisation terminating group;
(CO—V—O) represents a POAC chain obtained from two or more different linear hydroxy-$C_{1-6}$-alkylene carboxylic acids or lactones thereof;
X is a bridging group which contains a residue of an ethylenically unsaturated group;
Z is an amino or imino group or a moiety containing an amino or imino group attached to X via the ethylenically unsaturated group; and
m is from 2 to 200.

5. An amine dispersant as claimed in claim 4 wherein the moiety containing an amino or imino group is a polyamine or polyimine.

6. An amine dispersant as claimed in claim 5 wherein the polyimine is polyethyleneimine.

7. An amine dispersant as claimed in claim 4 wherein T is optionally substituted $C_{1-35}$-hydrocarbyl.

8. An amine dispersant as claimed in claim 4 obtained from a TPOAC alcohol of formula 4

$$TO-(CO-V-O)_m-H \quad (4)$$

wherein T, (CO—V—O), and m are as defined.

9. An amine dispersant as claimed in claim 1 which is represented by formula 3

wherein

X—*—*—X represents a polyamine or polyimine;
Y represents a POAC chain; and
q is from 2 to 2000.

10. An amine dispersant as claimed in claim 9 wherein the weight ratio of POAC chains represent by Y to polyamine or polyimine is between 18:1 and 8:1.

11. An amine dispersant as claimed in claim 4 containing one or more groups of formula 6 attached to Z

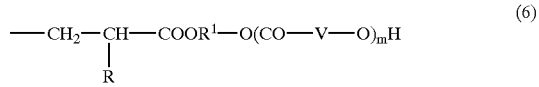

$$-CH_2-CH-COOR^1-O(CO-V-O)_mH \quad (6)$$
$$\quad\quad\quad | \quad\quad\quad\quad\quad\quad\quad\quad\quad\quad\quad\quad$$
$$\quad\quad\quad R$$

wherein (CO—V—O) and m are as defined;
R is $C_{1-4}$-alkyl; and
$R^1$ is an aliphatic or aromatic residue containing up to 10 carbon atoms.

12. A process for making a dispersant as claimed in claim 11 which comprises reacting a compound of formula 7

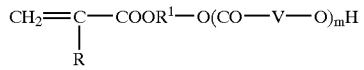 (7)

with an amine, imine, polyamine or polyimine, wherein (CO—V—O) represents a POAC chain obtained form two or more different linear hydroxy-$C_{1-6}$-alkylene carboxylic acids or lactones thereof;

R is $C_{1-4}$-alkyl;

$R^1$ is an aliphatic or aromatic residue containing up to 10 carbon atoms; and m is from 2 to 200.

13. A compound of formula 7

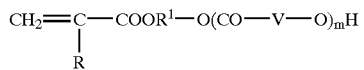 (7)

wherein (CO—V—O) represents a POAC chain obtained from two or more different linear hydroxy-$C_{1-6}$-alkylene carboxylic acids or lactones thereof;

R is $C_{1-4}$-alkyl;

$R^1$ is an aliphatic or aromatic residue containing up to 10 carbon atoms; and m is from 2 to 200.

14. A compound as claimed in claim 13 wherein $R^1$ is —$C_2H_4$—.

15. A composition comprising a particulate solid and an amine dispersant as claimed in claim 1.

16. A dispersion comprising a particulate solid, an organic medium and an amine dispersant as claimed in claim 1.

17. A mill-base comprising a particulate solid, film-forming resin and an amine dispersant as claimed in claim 1.

18. A paint or printing ink comprising a particulate solid, film-forming resin, organic medium and an amine, dispersant as claimed in claim 1.

* * * * *